US007954803B2

(12) United States Patent
Kitagawa et al.

(10) Patent No.: US 7,954,803 B2
(45) Date of Patent: Jun. 7, 2011

(54) IMAGE READING APPARATUS

(75) Inventors: Yasuhiko Kitagawa, Ishikawa (JP);
Yusuke Nakashima, Ishikawa (JP);
Satoshi Kubo, Ishikawa (JP)

(73) Assignee: PFU Limited, Ishikawa (JP)

( * ) Notice: Subject to any disclaimer, the term of this patent is extended or adjusted under 35 U.S.C. 154(b) by 270 days.

(21) Appl. No.: 12/049,101

(22) Filed: Mar. 14, 2008

(65) Prior Publication Data
US 2008/0285097 A1 Nov. 20, 2008

(30) Foreign Application Priority Data

May 16, 2007 (JP) ................... 2007-130416

(51) Int. Cl.
B65H 3/44 (2006.01)
(52) U.S. Cl. ............. 271/9.01; 271/9.09; 271/9.13; 271/274
(58) Field of Classification Search ................ 271/273, 271/274, 9.01, 9.09, 9.13, 272
See application file for complete search history.

(56) References Cited

U.S. PATENT DOCUMENTS

| | | | | | |
|---|---|---|---|---|---|
| 4,195,832 A | * | 4/1980 | Krumrey | | 271/274 |
| 4,619,451 A | * | 10/1986 | Dodge | | 271/274 |
| 4,974,680 A | * | 12/1990 | Nishida et al. | | 271/274 |
| 5,921,545 A | * | 7/1999 | Kobayashi et al. | | 271/242 |
| 5,975,516 A | * | 11/1999 | Maruchi et al. | | 271/10.12 |
| 6,000,693 A | * | 12/1999 | Tranquilla | | 271/263 |
| 6,032,951 A | * | 3/2000 | Yamaguchi | | 271/274 |
| 6,308,949 B1 | * | 10/2001 | Ito et al. | | 271/251 |
| 6,568,674 B2 | * | 5/2003 | Matsuda | | 271/274 |
| 6,682,069 B2 | * | 1/2004 | Shibabuki | | 271/274 |
| 7,431,292 B2 | * | 10/2008 | Goto | | 271/272 |
| 7,458,573 B2 | * | 12/2008 | Park | | 271/122 |
| 2002/0060423 A1 | * | 5/2002 | Shibabuki | | 271/272 |
| 2004/0251619 A1 | * | 12/2004 | Goto | | 271/274 |
| 2005/0236759 A1 | * | 10/2005 | Acton | | 271/114 |
| 2006/0226592 A1 | * | 10/2006 | Klein | | 271/117 |

FOREIGN PATENT DOCUMENTS
JP          09-284478 A    10/1997
* cited by examiner

*Primary Examiner* — Stefanos Karmis
*Assistant Examiner* — Howard Sanders
(74) *Attorney, Agent, or Firm* — Lowe, Hauptman, Ham & Berner, LLP

(57) ABSTRACT

An image reading apparatus includes pairs of rollers, each including a driving roller and a driven roller. The pairs of rollers are arranged along the rotation axis direction of the driving roller and constitute a first roller group and a second roller group for conveying a first medium and a second medium thicker than the first medium, respectively. The center of the first roller group is identical in the rotation axis direction to that of a first conveying area where the first medium is conveyed. The center of the second roller group is identical in the rotation axis direction to that of a second conveying area where the second medium is conveyed. At least one pair of rollers in the second roller group is arranged outside the first roller group within the first conveying area.

14 Claims, 12 Drawing Sheets

IMAGE READING APPARATUS

RELATED APPLICATIONS

The present application is based on, and claims priority from, Japan Application Number 2007-130416, filed May 16, 2007, the disclosure of which is hereby incorporated by reference herein in its entirety.

BACKGROUND OF THE INVENTION

1. Field of the Invention

The present invention relates to an image reading apparatus.

2. Description of the Related Art

Among conventional image reading apparatuses is an auto-document-feeder type image reading apparatus (hereinafter, "ADF image-reading apparatus") that can successively read images from sheet-type media (hereinafter, "sheets") stacked thereon. That is, such an ADF image-reading apparatus can automatically and successively feed a large number of sheets having a predetermined size for reading images therefrom.

Japanese Patent Application Laid-open No. H9-284478 discloses a conventional ADF image-reading apparatus. The conventional ADF image-reading apparatus includes an automatic feeding unit arranged on one side of the conveying unit, and a manual feeding unit arranged on another side of the conveying unit. The conveying unit conveys sheets from the automatic feeding unit and the manual feeding unit to an image reading unit. The conventional ADF-image reading apparatus switches the direction in which a sheet is conveyed (conveying direction) between a normal conveying direction and a reverse conveying direction. The automatic feeding unit automatically separates one sheet at a time from the sheets stacked thereon and feed the separated sheet to the conveying unit. On the other hand, sheets not separatable in the automatic feeding unit (e.g., thin paper sheets or overhead projector (OHP) films) can be manually fed one by one from the manual feeding unit.

To achieve a compact structure, the conventional ADF image-reading apparatus includes a bend section in a conveying path between the automatic feeding unit and the manual feeding unit. However, when, e.g., a comparatively thick card-type medium (hereinafter, "card document") having higher rigidity is fed from either one of the automatic feeding unit and the manual feeding unit, it is likely that the card document gets damaged by being forced to bend at the bend section. Even if it is assumed that the card document does not get damaged at the bend section, a larger driving force may be necessary to convey it over the bend section. As a result, it becomes difficult to downsize the ADF image reading apparatus. To solve such a problem, a conventional ADF image reading apparatus such as an ADF image reading apparatus 001 described below with reference to FIG. 12 includes a separate card-document feeding unit for feeding exclusively the card documents. Moreover, the conveying path from the card-document feeding unit to a stacking unit is laid in a straight line without any bends therebetween.

The ADF image reading apparatus 001 includes three pairs of rollers 004a, 004b, and 004c, a conveying unit 005, and an ADF unit. The pairs of rollers 004a, 004b, and 004c are arranged symmetrically with respect to the center position of the conveying path for the sheet documents along the width direction of the sheet documents. Each of the pairs of rollers 004a, 004b, and 004c includes a rotatable driving roller 002 and a driven roller 003 that is biased towards and rotates along with the driving roller 002. The ADF unit includes a pick roller 006. The conveying unit 005 conveys a sheet document nipped between the driving roller 002 and the driven roller 003. To make the structure of the apparatus compact, two conveying paths, viz., a conveying path for sheet documents and a conveying path for card documents, are arranged to partially overlap in the width direction. When conveying a sheet document, the pick roller 006 separates a single sheet document at a time and conveys the separated sheet document over the conveying path for sheet documents. A sheet document is conveyed by using all the three pairs of rollers 004a, 004b, and 004c, while a card document is conveyed by using only the pair of rollers 004c arranged on one end.

Because only one pair of rollers 004c is used to convey a card document, it is likely that the card document is not stably conveyed. To solve such a problem, another configuration is implemented in which, e.g., four pairs of rollers 004a, 004b, 004c, and 004d are arranged symmetrically across the center position of the conveying path for the sheet documents along the width direction. In this case, all the four pairs of rollers 004a, 004b, 004c, and 004d are used to convey a sheet document, while two pairs of rollers 004c and 004d arranged side by side on one end are used to convey a card document.

However, in case a sheet document gets skewed before reaching the pairs of rollers 004a, 004b, 004c, and 004d, and if the distance between the farthest pairs of rollers 004a and 004d is large as shown in FIG. 13A, then it is likely that the amount of skew increases because of the large distance between the pairs of rollers 004a and 004d. That is, when a skewed document is conveyed to the pairs of rollers 004a, 004b, 004c, and 004d, the pair of rollers 004a first nips one end of the conveyed sheet document and starts conveying the nipped portion. The pair of rollers 004d nips the other end of the sheet document after the pair of rollers 004b has already conveyed a large portion on one side of the sheet document. Thus, the portion of the sheet document nipped and conveyed by the pair of rollers 004a precedes the portion of the sheet document nipped and conveyed by the pair of rollers 004d by a large margin. As a result, the sheet document spins around in the counterclockwise direction. The amount of increase in skew in the abovementioned configuration is more as compared to a configuration in which two pairs of rollers 004a and 004b are arranged symmetrically across the center position of the conveying path of the sheet documents as shown in FIG. 13B. Moreover, when four pairs of rollers 004a, 004b, 004c, and 004d are arranged, the increase in skew can be prevented only in the case of conveying a card document and not in the case of a sheet document. Thus, it becomes difficult to stably convey both the sheet document and the card document using the same ADF image reading apparatus 001.

SUMMARY OF THE INVENTION

It is an object of the present invention to at least partially solve the problems in the conventional technology.

According to an aspect of the present invention, there is provided an image reading apparatus including a reading unit that reads an image from a first medium and a second medium thicker than the first medium; a conveying unit that includes a plurality of pairs of rollers, each pair including a driving roller and a driven roller that is biased towards the driving roller and rotates along with the driving roller, and that conveys the first medium and the second medium to the reading unit while nipping the first medium and the second medium between the driving roller and the driven roller; a controlling member that controls a biasing force applied by the driven roller to the first medium. The pairs of rollers are arranged along the direction of the rotation axis of the driving roller, and constitute a first roller group and a second roller group. The first roller group conveys the first medium, while the second roller group conveys the second medium. The center position of the first roller group and the center position of a first conveying area, over which the first medium is conveyed, are identical with respect to the direction of the rotation axis. The center position of the second roller group and the center position of a second conveying area, over which the second medium is conveyed, are identical with respect to the direction of the rotation axis. At least one pair of rollers in the second roller group is arranged outside of one end of the first roller group in the direction of the rotation axis and within the first conveying area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

While an image reading apparatus of the embodiments is explained, e.g., as an auto-document-feeder type image scanner (hereinafter, "ADF scanner") capable of automatically and successively feeding and scanning a large number of sheets, it can be a copier, a multifunction product (MFP), a facsimile machine, or a character recognizing device.

Figure 1:
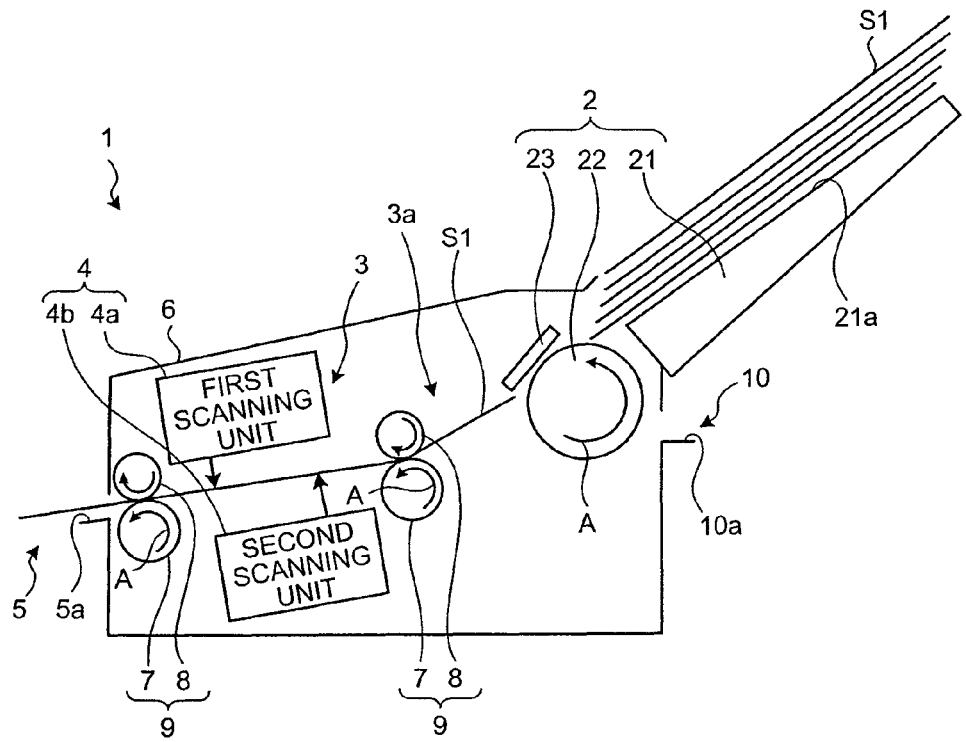
FIG. 1 is a schematic diagram of an image reading apparatus according to an embodiment of the present invention when a sheet document is scanned.
Figure 2:
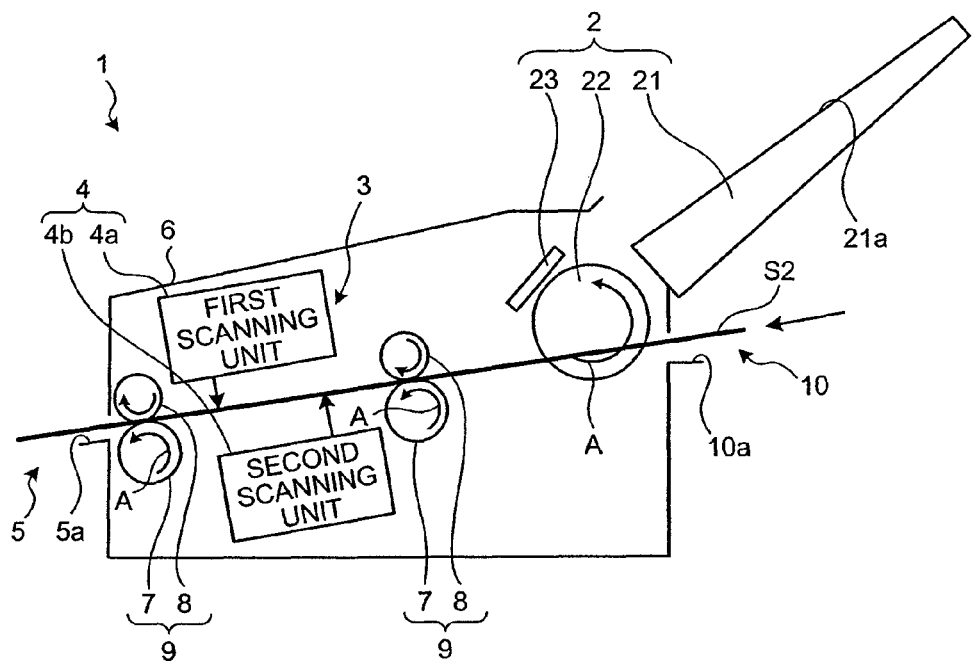
FIG. 2 is a schematic diagram of the image reading apparatus when a card document is scanned.
Figure 3:
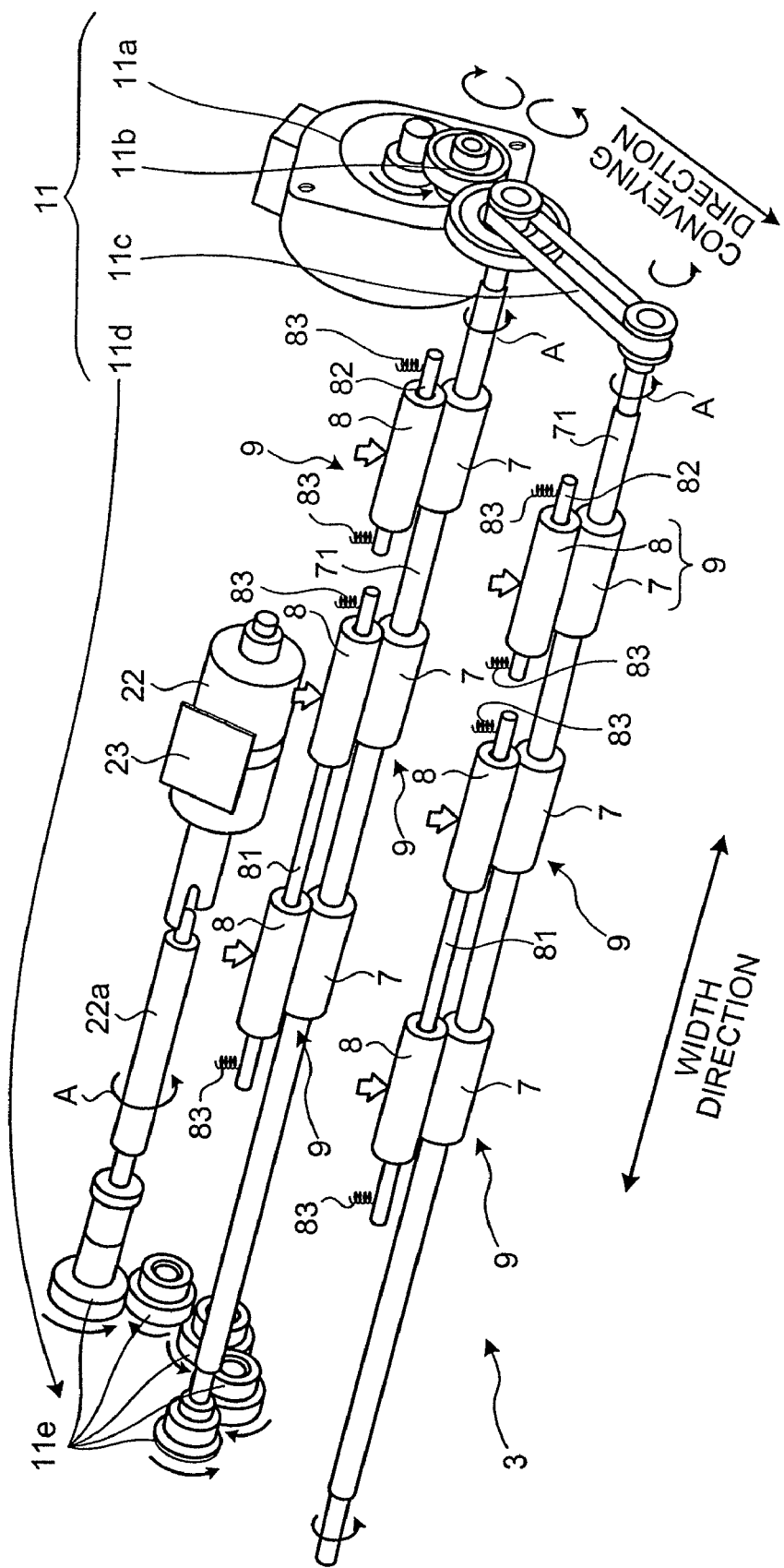
FIG. 3 is a perspective view of a conveying unit shown in FIG. 1.

FIG. 1 is a schematic diagram of an ADF scanner 1 as an image reading apparatus according to an embodiment of the present invention when a sheet document is scanned. FIG. 2 is a schematic diagram of the ADF scanner 1 when a card document is scanned. The ADF scanner 1 includes an automatic document feeder (ADF) unit 2 that functions as a primary feeding unit to automatically feed first type of media such as normal sheet-type documents, viz., sheet documents S1 stacked thereon, a conveying unit 3 that conveys the fed sheet documents S1, an optical scanning unit 4 that scans the conveyed sheet documents S1 for obtaining images, a stacking unit 5 that receives the sheet documents S1 discharged after scanning, and a casing 6 that houses the constituent elements of the ADF scanner 1. The term "document" as used herein refers to any sheet-type medium that contains an image including text, photographs, and charts.

The sheet documents S1 can be, e.g., commonly-used photocopying paper sheets having normal thickness and rigidity. The sheet documents S1 can be separated one by one from the stack and fed to the conveying unit 3 by the ADF unit 2. Moreover, the sheet documents S1 do not get damaged by passing over a bend section 3a, described later, in a conveying path. Thus, the sheet documents S1 are stacked on the ADF unit 2 for automatic feeding.

As described above, the ADF unit 2 separates the sheet documents S1 one by one from the stack and feeds the separated one to the conveying unit 3. The ADF unit 2 is arranged at one side of the conveying unit 3. The ADF unit 2 includes a shooter 21, a pick roller 22, and a separation pad 23. The ADF unit 2 can feed the sheet documents S1 of different sizes to the conveying unit 3.

The shooter 21 includes a substantially rectangular stacking surface 21a on which the sheet documents S1 are stacked. The stacked sheet documents S1 are kept pressed against the stacking surface 21a by a biasing force of a biasing unit (not shown).

The pick roller 22 is arranged close to the feeding end of the stacking surface 21a, i.e., the end of the stacking surface 21a from which the sheet documents S1 are fed one by one to the conveying unit 3. The pick roller 22 picks the bottommost of the stacked sheet documents S1 to feed it to the conveying unit 3 at each time of feeding. The pick roller 22 is cylindrical in shape and made of a material such as foamed rubber that has high frictional force. The pick roller 22 extends along the stacking surface 21a with its central axis substantially parallel to the width direction of the stacking surface 21a, i.e., perpendicular to the feeding direction of the sheet documents S1. In other words, the pick roller 22 is arranged at that side of the rectangular stacking surface 21a which faces the conveying unit 3, and the central axis of the pick roller 22 is substantially parallel to that side. Moreover, the central axis of the pick roller 22 is positioned on the side of the bottom surface of the shooter 21, i.e., on the side opposite to the stacking surface 21a. The pick roller 22 is arranged such that its outer circumference lies on the extended plane of the stacking surface 21a. When the pick roller 22 rotates around its central axis in a pick direction, i.e., in the direction to move the stacked sheet documents S away from the shooter 21 on the extended plane of the stacking surface 21a (indicated by a counterclockwise arrow "A" in FIG. 1), then the stacked sheet documents S1 get mounted on the pick roller 22 and are fed one by one to the conveying unit 3.

The separation pad 23 is arranged to abut against the pick roller 22 on the side of the stacking surface 21a. When the pick roller 22 rotates, the bottommost of the sheet documents S1 gets separated between the separation pad 23 and the pick roller 22, and is fed to the conveying unit 3.

In this way, the sheet documents S1 are separately and successively fed to the conveying unit 3.

The conveying unit 3 conveys each fed sheet document S1 to the optical scanning unit 4 and then to the stacking unit 5. The stacking unit 5 is arranged at the side opposite to which the ADF unit 2 is arranged at. The conveying unit 3 includes a plurality of pairs of rollers 9 and a guide member (not shown) arranged along the conveying path. The pairs of rollers 9 each include a rotatable driving roller 7 and a driven roller 8. When the driving roller 7 rotates, each sheet document S1 fed by the ADF unit 2 is nipped between the driving roller 7 and the driven roller 8. Thus, the sheet document S1 is conveyed towards the stacking unit 5 through the pairs of rollers 9. The guide member guides the sheet documents S conveyed by the pairs of rollers 9 over the conveying path to the stacking unit 5.

Moreover, the conveying unit 3 includes the bend section 3a in the conveying path that facilitates in downsizing the ADF scanner 1. That is, because the conveying path has a bend at the bend section 3a, each sheet document S1 fed from the ADF unit 2 is first conveyed up to the bend section 3a. The carrying path bends at the bend section 3a such that the sheet document S1 is then conveyed to the stacking unit 5. In other words, the conveying direction of each sheet document S1 fed from the ADF unit 2 changes at the bend section 3a towards the stacking unit 5. The conveying unit 3 is described later in detail with reference to FIGS. 3 to 10.

The optical scanning unit 4 is arranged in the conveying path for scanning each conveyed sheet document S1 and obtaining images therefrom. More particularly, the optical scanning unit 4 is arranged in the conveying path between the bend section 3a and the stacking unit 5. The optical scanning unit 4 includes a second scanning unit 4b that scans the front surface of the sheet document S1 and a first scanning unit 4a that scans the rear surface of the sheet document S1. The second scanning unit 4b and the first scanning unit 4a have almost identical configurations. Hence, unless otherwise noted, the second scanning unit 4b and the first scanning unit 4a are not distinguished hereinafter, and are collectively referred to as the optical scanning unit 4 for simplification.

The optical scanning unit 4 optically scans each sheet document S1 and obtains image data by converting the images into electrical signals. The optical scanning unit 4 includes a light source (not shown), an image sensor (not shown), and a lens (not shown) that functions as an optical system. The light source irradiates each sheet document S1 with a light from a light emitting device such as a light emitting diode (LED). The lens focuses the light reflected from each sheet document S1 on a light receiving surface of the image sensor. Upon receiving the reflected light through the lens, the image sensor obtains the image data by converting the received light into electrical signals. The image sensor can be, e.g., a charge-coupled device (CCD) line sensor, which is a linear image sensor (one-dimensional image sensor) in which a plurality of optical-electrical conversion elements are linearly arranged perpendicular to the conveying direction of the sheet document S1. The optical-electrical conversion elements generate electric charge upon receiving light. The array direction of the optical-electrical conversion elements, i.e., the longitudinal direction of the image sensor is the main scanning direction. Thus, the direction perpendicular to the main scanning direction, i.e., the conveying direction of the sheet document S1 becomes the sub-scanning direction.

To sum up, upon being irradiated with the light from the light source, each sheet document S1 reflects the light. The reflected light passes through the lens, falls onto the image sensor, and is converted into electrical signals such that images on each sheet document S1 are obtained for each scanning-line in the main scanning direction. As the sheet document S1 keeps moving with respect to the image sensor in the sub-scanning direction, the optical scanning unit 4 repetitively scans the sheet document S1 along the sub-scanning direction to obtain two-dimensional image data.

The stacking unit 5 includes a discharge opening 5a arranged in the casing 6. Each sheet document S1 scanned by the optical scanning unit 4 is discharged out of the casing 6 to the stacking unit 5 from the discharge opening 5a. The stacking unit 5 can include a stacking tray for stacking thereon the discharged sheet documents S1.

As described above, to facilitate downsizing of the ADF scanner 1, the conveying unit 3 includes the bend section 3a in the conveying path. However, if a second type of medium, viz., card documents S2 (refer to FIG. 2), which are thicker than the sheet documents S1, are conveyed from the ADF unit 2 to the stacking unit 5, there is a possibility that the card documents S2 get damaged by being forced to bend at the bend section 3a during conveyance because of more thickness and higher rigidity. Even if it is assumed that the card documents S2 do not get damaged at the bend section 3a, a larger driving force may become necessary to convey them to the stacking unit 5 over the bend section 3a. As a result, it becomes difficult to downsize the ADF scanner 1.

To solve such a problem, in addition to the ADF unit 2, the ADF scanner 1 also includes a card-document feeding unit 10 that functions as a secondary feeding unit. Generally, the card documents S2 are not only thicker but also smaller in width (i.e., smaller in size in the direction perpendicular to the conveying direction) than the sheet documents S1 (refer to FIG. 4). The card-document feeding unit 10 can handle various sizes of card documents. In other words, the conveying unit 3 is capable of conveying various sizes of card documents.

The card-document feeding unit 10 includes a feed opening 10a arranged in the casing 6. The card documents S2 can be manually fed one by one from the card-document feeding unit 10 such that the fed card documents S2 are conveyed to the conveying unit 3 through the feed opening 10a. Each fed card document S2 reaches the conveying unit 3 by laterally passing by the pick roller 22 in the width direction and is then discharged to the stacking unit 5. The pick roller 22 is arranged as inferiorly as possible in the ADF unit 2 such that the card document S2 passes by the pick roller 22. Such a configuration helps in reducing the height of the ADF scanner 1. As described above, the conveying path from the ADF unit 2 to the stacking unit 5 includes the bend section 3a. However, the card-document feeding unit 10 is arranged on opposite side of the stacking unit 5 in the conveying direction such that a straight conveying path is laid for conveying the card documents S2 from the card-document feeding unit 10 to the stacking unit 5. That is, the conveying path from the card-document feeding unit 10 up to the stacking unit 5 does not include the bend section 3a. Thus, there is no possibility of the card documents S2 getting bent or damaged at the bend section 3a. Moreover, no large driving force is required to convey the card documents S2 over a straight conveying path. As a result, the ADF scanner 1 can be downsized.

Figure 4:
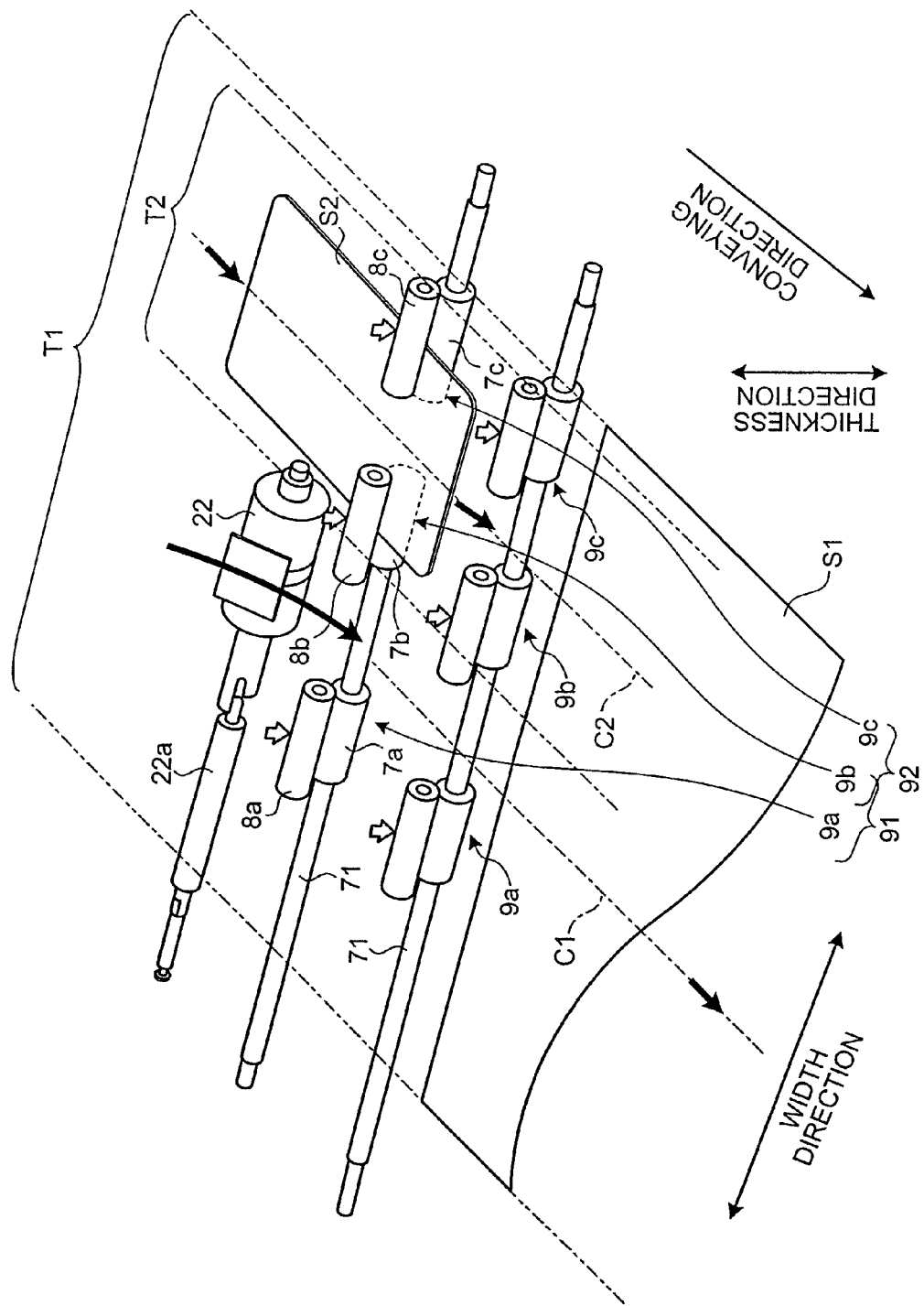
FIG. 4 is a perspective view of a group of pairs of rollers for conveying a sheet document and a group of pairs of rollers for conveying a card document.

The area in the conveying path over which each sheet document S1, which is separated by the pick roller 22, is conveyed is referred to as a sheet-document conveying area T1 (refer to FIG. 4) and the area in the conveying path over which each card document S2, which is manually fed from the card-document feeding unit 10, is conveyed is referred to as a card-document conveying area T2 (refer to FIG. 4). To further downsize the ADF scanner 1, the card-document conveying area T2 is arranged to partially overlap the sheet-document conveying area T1 in the width direction of the sheet documents S1 and the card documents S2.

The width direction is parallel to the direction of rotation axis of the driving rollers 7. That is, when a fed sheet document S1 or a fed card document S2 is assumed to be not skewed as shown in FIG. 4, the width direction is horizontally orthogonal to the conveying direction. Moreover, the width direction is also orthogonal to the thickness of the sheet documents S1 and the card documents S2. Thus, in other words, the direction of the rotation axis of the driving rollers 7, i.e., the width direction is the main scanning direction of the image sensor. On the other hand, the conveying direction of the sheet documents S1 and the card documents S2 becomes the sub-scanning direction.

The sheet-document conveying area T1 and the card-document conveying area T2 are large enough to be able to accommodate the widest available sheet documents S1 and the card documents S2, respectively, that the conveying unit 3 can convey. That is, the sheet-document conveying area T1 and the card-document conveying area T2 are compatible to the maximum available size of the sheet documents S1 and the card documents S2, respectively. The image sensor of the optical scanning unit 4 is arranged along the width direction.

As described above with reference to FIG. 3, the conveying unit 3 includes the pairs of rollers 9, each including the rotatable driving roller 7 and the driven roller 8. Each driven roller 8 is kept abutted against the corresponding driving roller 7. The pairs of rollers 9 are arranged in the width direction and form two parallel rows along the conveying direction. While being conveyed to the stacking unit 5, each sheet document S1 or each card document S2 is nipped between the pairs of rollers 9 arranged in a first row, and is sequentially conveyed to the pairs of rollers 9 arranged in a second row. The ADF scanner 1 further includes a rotating unit 11 to rotate the driving rollers 7. The rotating unit 11 includes a motor 11a, a transmitting gear 11b, and a belt 11c.

The driving rollers 7 are rotated by the torque from the motor 11a. The driven rollers 8 are arranged to abut against and rotate along the corresponding driving rollers 7. The driving rollers 7 and the driven rollers 8 are cylindrical in shape with almost identical diameter. The central axis of each driving roller 7 as well as each driven roller 8 is arranged to be horizontally orthogonal to the conveying direction, i.e., along the width direction. Each driving roller 7 and each driven roller 8 is arranged to be rotatable around its central axis.

More particularly, the conveying unit 3 includes two driving roller shafts 71 that are arranged horizontally orthogonal to the conveying direction. Three driving rollers 7 are fixed around each driving roller shaft 71. Each driving roller 7 rotates along with the corresponding driving roller shaft 71. The driving roller shafts 71 are arranged to form two parallel rows that are spaced-apart by a predetermined distance in the conveying direction. Thus, each driving roller shaft 71 forms a part of a row of the pairs of rollers 9. The belt 11c is stretched around the same end of the two driving roller shafts 71. One of the driving roller shafts 71 is connected to the motor 11a via the transmitting gear 11b and rotates by the torque transmitted from the motor 11a via the transmitting gear 11b. Consequently, the other driving roller shaft 71 also rotates upon receiving the torque via the belt 11c.

As described above, one driven roller 8 is abutted against each driving roller 7. Thus, three driven rollers 8 are arranged corresponding to the three driving rollers 7 arranged in the width direction to form two parallel rows in the conveying direction. That is, a total of six driving rollers 7 and six driven rollers 8 are arranged. Among the three driven rollers 8 in each row, two driven rollers 8 are separately and rotatably fixed around a first support shaft 81, while the remaining driven roller 8 is separately and rotatably fixed around a second support shaft 82. The first support shaft 81 and the second support shaft 82 form a pair and are arranged horizontally orthogonal to the conveying direction but in alignment in the width direction. Two such pairs of the first support shaft 81 and the second support shaft 82 are arranged spaced-apart by a predetermined distance in the conveying direction. Thus, each pair of the first support shaft 81 and the second support shaft 82 forms a part of a row of the pairs of rollers 9.

A compression spring 83 is attached to each side of the first support shaft 81 as well as the second support shaft 82 in each row. Each compression spring 83 biases the corresponding first support shaft 81 or the corresponding second support shaft 82 towards the corresponding driving roller 7. Each compression spring 83 is cylindrically coiled and has an internal spring axis (not shown). One end of each compression spring 83 is fixed to the corresponding first support shaft 81 or the corresponding second support shaft 82, and the other end is fixed to the internal wall surface of the casing 6 (refer to FIG. 7). Consequently, on one hand, each driven roller 8 is fixed to the casing 6. On the other hand, each driven roller 8 is biased towards the corresponding driving roller 7. The reason for separately using the first support shaft 81 and the second support shaft 82 is described later in detail. Moreover, although the pairs of rollers 9 are arranged in two rows, the description hereinafter is given with reference to only one row unless otherwise noted.

Each driving roller 7 rotates by the torque from the motor 11a in a rotating direction indicated by a counterclockwise arrow "A" in FIGS. 1 and 2, i.e., in the direction in which the outer circumference of the driving roller 7 abutting against the corresponding driven roller 8 moves away from the ADF unit 2 towards the stacking unit 5. As the driving roller 7 starts rotating, the corresponding driven roller 8 also rotates in the direction indicated by a clockwise arrow shown in FIGS. 1 and 2, i.e., in the direction in which the outer circumference of the driven roller 8 abutting against the corresponding driving roller 7 moves away from the ADF unit 2 towards the stacking unit 5. Because of the biasing force exerted on the driven roller 8 in the pairs of rollers 9, a fed sheet document S1 or a fed card document S2 is nipped between the corresponding rotating driving roller 7 and the driven roller 8, and is conveyed forward. In this way, a fed sheet document S1 or a fed card document S2 is sequentially conveyed to the pairs of rollers 9 arranged in a plurality of rows along the conveying path and then discharged to the stacking unit 5.

The pick roller 22 also rotates by the torque from the motor 11a. Thus, the motor 11a rotate the driving rollers 7 as well as the pick roller 22 thereby enabling to downsize the ADF scanner 1. However, to maintain a predetermined distance between the trailing edge of a sheet document S1 fed from the ADF unit 2 and the leading edge of a next sheet document S1 to be fed, it is necessary to make the driving roller 7 to rotate at a relatively higher speed than the pick roller 22.

To achieve that, the rotating unit 11 includes an array of transmitting gears 11d that functions as a rotating-speed varying mechanism. Meanwhile, the pick roller 22 is fixed around and rotates along with a pick roller shaft 22a. The pick roller shaft 22a is arranged horizontally orthogonal to the conveying direction. As described above, one of the driving roller shafts 71 is connected to the motor 11a via the transmitting gear 11b and rotates by the torque transmitted from the motor 11a via the transmitting gear 11b. The array of transmitting gears 11d is arranged at the other end of that driving roller shaft 71 which is connected to the motor 11a. The array of transmitting gears 11d includes five transmitting gears 11e.

The array of transmitting gears 11d is used to transmit torque to the pick roller shaft 22a. Each transmitting gear 11e is arranged to mesh with the neighboring transmitting gears 11e. Thus, by setting appropriate number of teeth in each transmitting gear 11e, it is possible to vary the rotating speed of the driving roller 7 and the pick roller 22. As a result, not only a predetermined distance can be maintained between the sheet documents S1 fed from the ADF unit 2 but the driving roller 7 and the pick roller 22 can also be rotated in the rotating direction "A".

Figure 5:
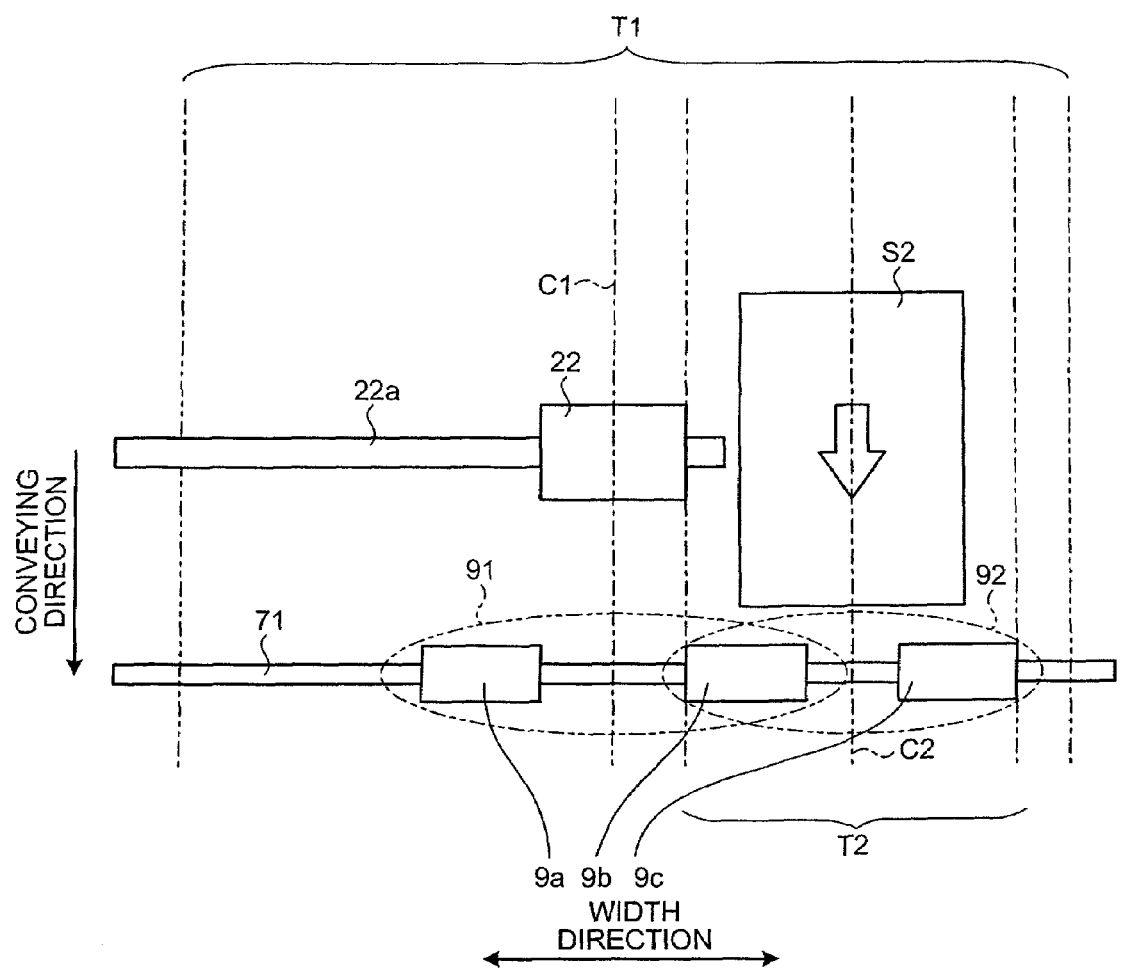
FIGS. 5 and 6 is plane views of the conveying unit when conveying a card document.
Figure 6:
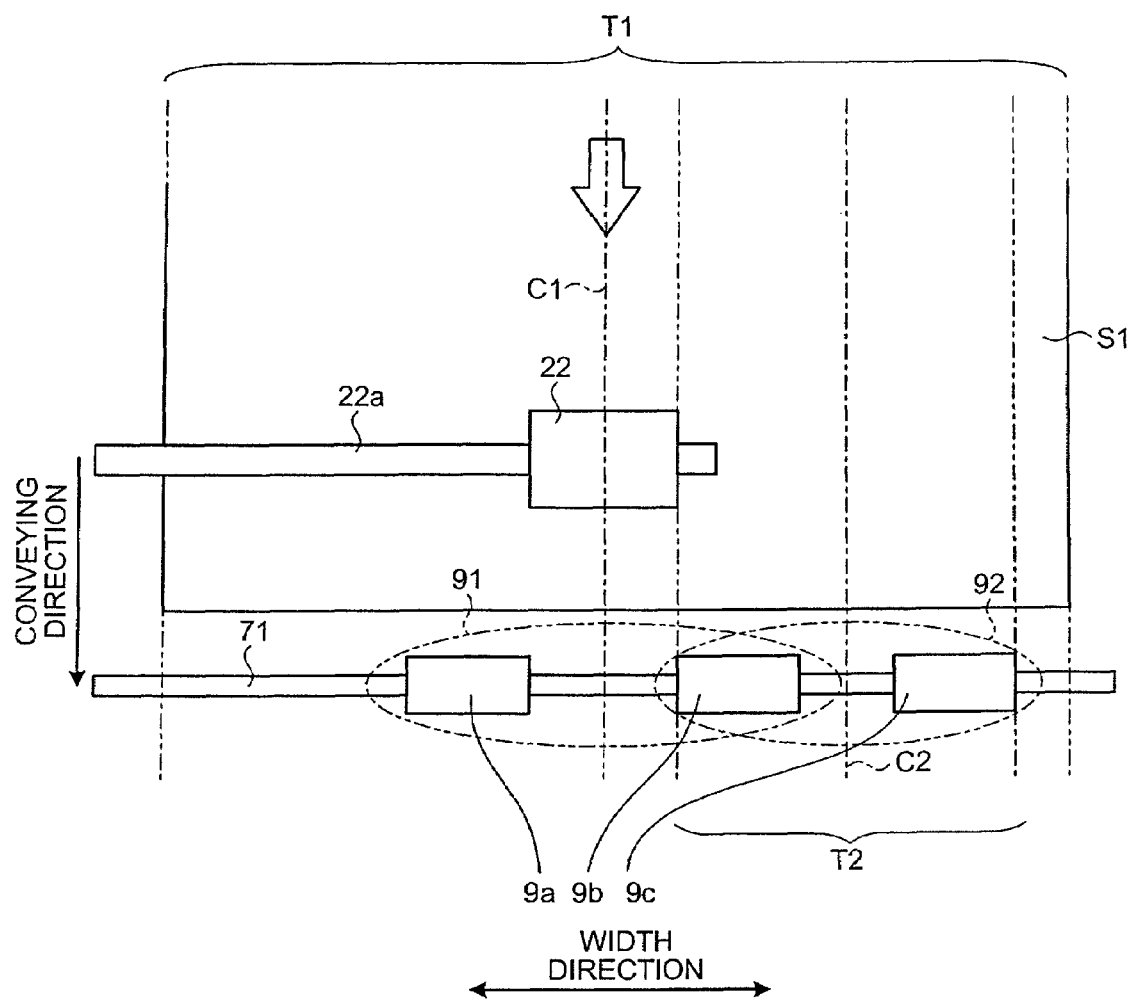

As described above, the card-document conveying area T2 partially overlaps the sheet-document conveying area T1 in the width direction. Moreover, each card document S2 fed from the card-document feeding unit 10 is conveyed while passing by the pick roller 22. Thus, as shown in FIGS. 4, 5, and 6, a first center position C1 with respect to the width direction within the sheet-document conveying area T1 and a second center position C2 with respect to the width direction within the card-document conveying area T2 are not in alignment.

The three pairs of rollers 9 are arranged in the width direction and form two parallel rows along the conveying direction within the sheet-document conveying area T1 and the card-document conveying area T2. The pairs of rollers 9 in each of the two parallel rows form two groups, viz., a first group of pairs of rollers 91 (hereinafter, "first roller group 91"), which corresponds to the sheet-document conveying area T1 and conveys the sheet documents S1, and a second group of pairs of rollers 92 (hereinafter, "second roller group 92"), which corresponds to the card-document conveying area T2 and conveys the card documents S2.

The pairs of rollers 9 in the first roller group 91 are hereinafter referred to as a pair of rollers 9a and a pair of rollers 9b, while the pairs of rollers 9 in the second roller group 92 are hereinafter referred to as the pair of rollers 9b and a pair of rollers 9c. That is, from among the three pairs of rollers 9a, 9b, and 9c arranged along the width direction, the pair of rollers 9a arranged on one end forms part of only the first roller group 91 (i.e., conveys only the sheet documents S1), the pair of rollers 9c arranged on the other end forms part of only the second roller group 92 (i.e., conveys only the card documents S2), and the pair of rollers 9b arranged between the pair of rollers 9a and the pair of rollers 9c forms part of the first roller group 91 as well as the second roller group 92 (i.e., conveys both the sheet documents S1 and the card documents S2). For simplification, the driving roller 7 and the driven roller 8 in the pair of rollers 9a are hereinafter referred to as a driving roller 7a and a driven roller 8a, respectively. Similarly, the driving roller 7 and the driven roller 8 in the pair of rollers 9b are hereinafter referred to as a driving roller 7b and a driven roller 8b, respectively. Lastly, the driving roller 7 and the driven roller 8 in the pair of rollers 9c are hereinafter referred to as a driving roller 7c and a driven roller 8c, respectively.

The center position of the first roller group 91 in the width direction is identical to the first center position C1, while the center position of the second roller group 92 in the width direction is identical to the second center position C2. That is, the pair of rollers 9a and the pair of rollers 9b are arranged symmetrically across the first center position C1 in the width direction. Similarly, the pair of rollers 9b and the pair of rollers 9c are arranged symmetrically across the second center position C2 in the width direction.

The center position of the first roller group 91 in the width direction is assumed to be the center between the farther end faces of the pairs of rollers 9a and 9b. Similarly, the center position of the second roller group 92 in the width direction is assumed to be the center between the farther end faces of the pairs of rollers 9b and 9c.

More particularly, the pair of rollers 9c is arranged between the second center position C2 and the boundary of the sheet-document conveying area T1 near to the second center position C2 (hereinafter, "second boundary"). The pair of rollers 9b is arranged between the second center position C2 and the first center position C1. The pair of rollers 9a is arranged between the first center position C1 and the boundary of the sheet-document conveying area T1 near to the first center position C1 (hereinafter, "first boundary"). Thus, the pairs of rollers 9a, 9b, and 9c are arranged asymmetrically with respect to the first center position C1 in the width direction.

As shown in FIGS. 7 to 10, from among the second roller group 92, the pair of rollers 9b is arranged as the outer pair of rollers at one end of the first roller group 91 in the width direction within the sheet-document conveying area T1. That is, the pair of rollers 9b forms part of the first roller group 91 as well as the second roller group 92. A stopper member 15b is arranged at the pair of rollers 9c that functions as a biasing-force controlling member to control the biasing force on the driven roller 8c with respect to the sheet documents S1. The pair of rollers 9c lies within the sheet-document conveying area T1 and outside the pair of rollers 9b in the width direction. Thus, both the pairs of rollers 9b and 9c in the second roller group 92 lie within the sheet-document conveying area T1.

The stopper member 15b is integrally arranged on a cover plate 15 that covers the driven rollers 8a, 8b, and 8c. More particularly, a compartment is formed between the cover plate 15 and the internal wall surface of the casing 6 in which the first support shaft 81, the second support shaft 82, and each compression spring 83 are enclosed (refer to FIGS. 7 and 9). The cover plate 15 includes a covering body 15a and the stopper member 15b, which is integrated with the covering body 15a. The covering body 15a lies opposite to the driving rollers 7a and 7b, and covers the corresponding driven rollers 8a and 8b. The stopper member 15b lies opposite to the driving roller 7c and covers the corresponding driven roller 8c. Moreover, the stopper member 15b lies closer to the compression springs 83 than the covering body 15a in the direction of thickness of the sheet documents S1 and the card documents S2. That is, the stopper member 15b protrudes from the covering body 15a towards the compression springs 83. The covering body 15a has two openings 16a and 16b for the driven rollers 8a and 8b, respectively. The stopper member 15b also has an opening 16c for the driven roller 8c. Each of the driven rollers 8a, 8b, and 8c is fixed around either one of the first support shaft 81 and the second support shaft 82 in the compartment between the cover plate 15 and the internal wall surface of the casing 6. Moreover, the outer circumference of each of the driven rollers 8a, 8b, and 8c is exposed through the corresponding openings 16a, 16b, and 16c, respectively. As a result, the driven rollers 8a, 8b, and 8c can abut against the corresponding driving rollers 7a, 7b, and 7c, respectively.

As described above with reference to FIG. 3, among the three driven rollers 8 in each row, two driven rollers 8 are fixed around the first support shaft 81, while the remaining driven roller 8 is fixed around the second support shaft 82. More particularly, as shown in FIGS. 7 and 9, the driven rollers 8a and 8b, whose biasing force on the sheet documents S1 is not controlled by the stopper member 15b, are fixed around the first support shaft 81; while the driven roller 8c, whose biasing force on the sheet documents S1 is controlled by the stopper member 15b, is fixed around the second support shaft

82. As a result, the first support shaft 81 can move the driven rollers 8a and 8b towards as well as away from the corresponding driving rollers 7a and 7b, respectively, in the direction of thickness of the sheet documents S1 and the card documents S2. On the other hand, the second support shaft 82 can separately move the driven roller 8c in the abovementioned direction of thickness. Thus, the driven rollers 8a and 8b move as a set, while the driven roller 8c moves independently.

Figure 7:
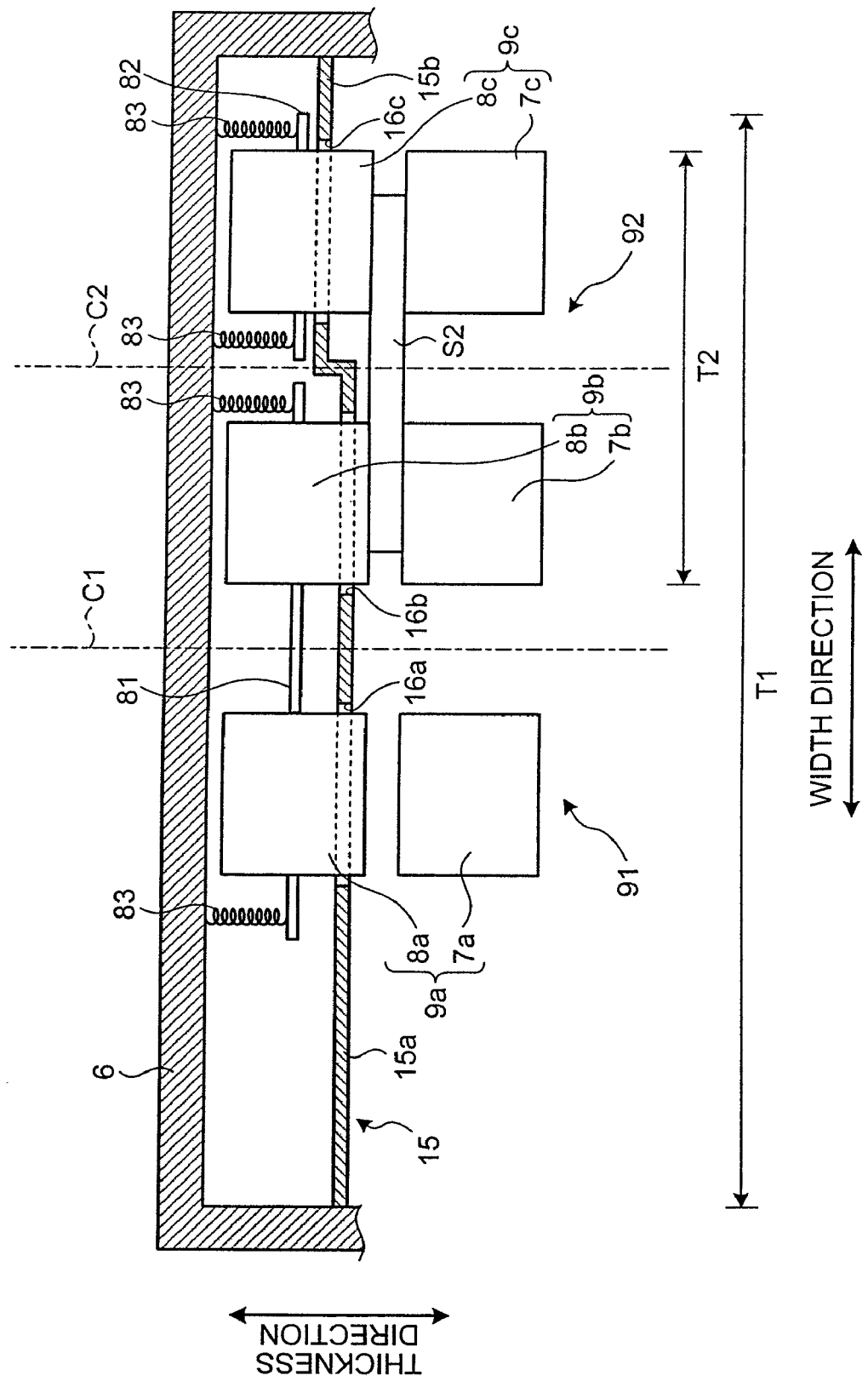
FIG. 7 is a cross section of the conveying unit in width direction when conveying a card document.
Figure 8:
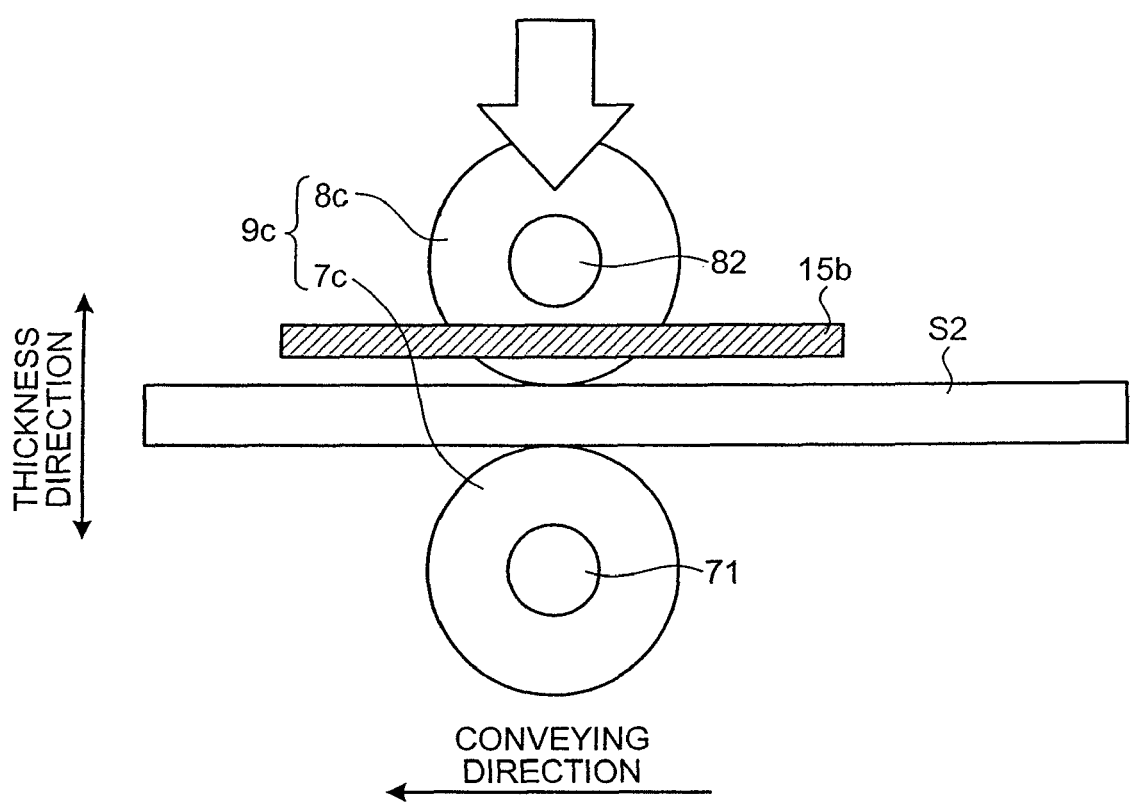
FIG. 8 is a cross section of the conveying unit in conveying direction when conveying a card document.

In the case of conveying a fed card document S2, the driven rollers 8b and 8c in the second roller group 92 come in contact with the fed card document S2 as shown in FIGS. 7 and 8. That is, as the driven rollers 8b and 8c are biased towards the driving rollers 7b and 7c, respectively, the fed card document S2 gets nipped between the driven roller 8b and the driving roller 7b, and the driven roller 8c and the driving roller 7c. The nipped card document S2 is then conveyed when the driving rollers 7b and 7c rotate. Because the pairs of rollers 9b and 9c are arranged symmetrically across the second center position C2 in the width direction, the biasing force of the driven roller 8b and the driven roller 8c is transmitted almost identically to each card document S2 in the width direction. As a result, the fed card document S2 gets nipped between the driven roller 8b and the driving roller 7b, and the driven roller 8c and the driving roller 7c in an even and balanced manner, and is stably conveyed in a maintained position.

Figure 9:
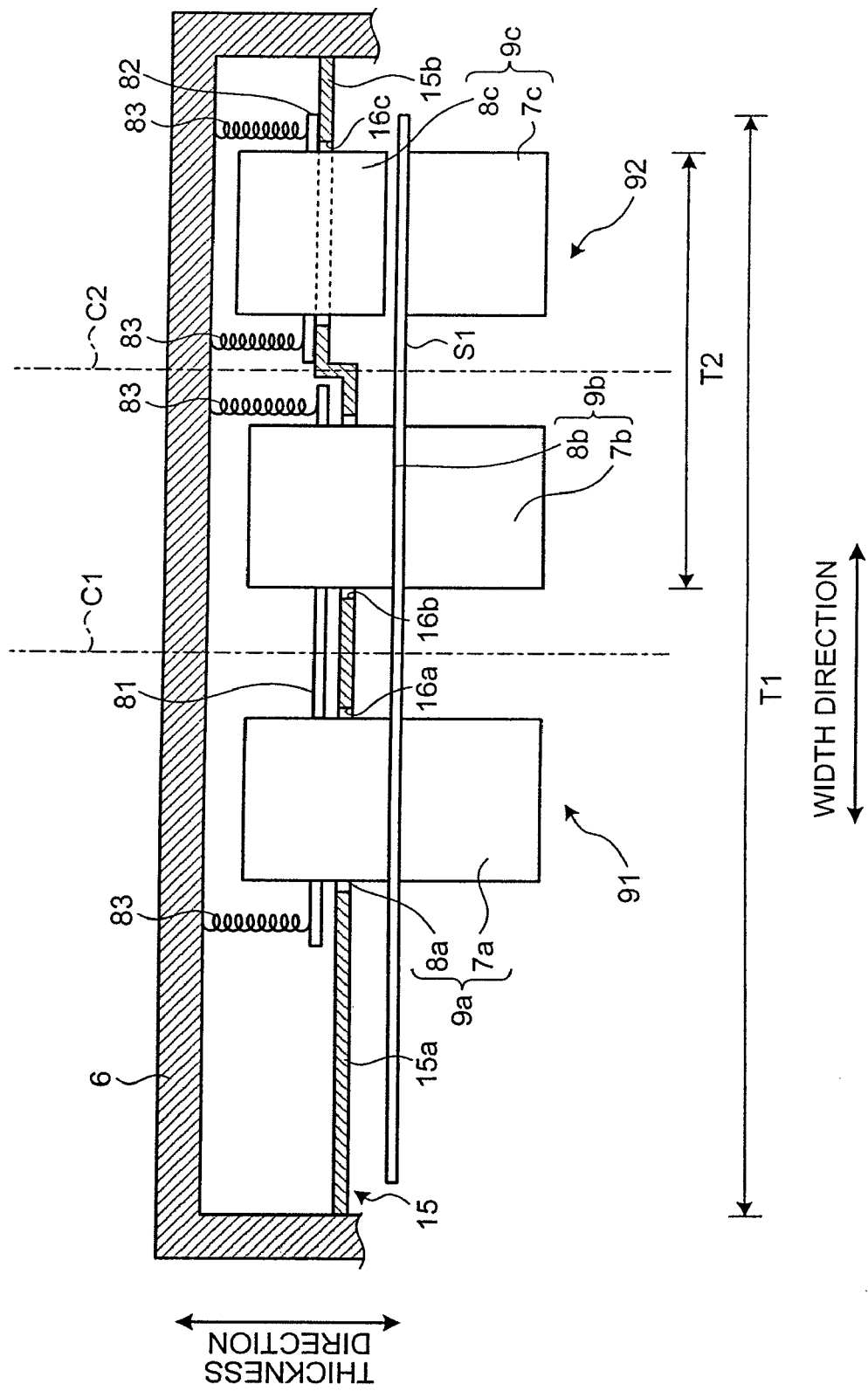
FIG. 9 is a cross section of the conveying unit in width direction when conveying a sheet document.
Figure 10:
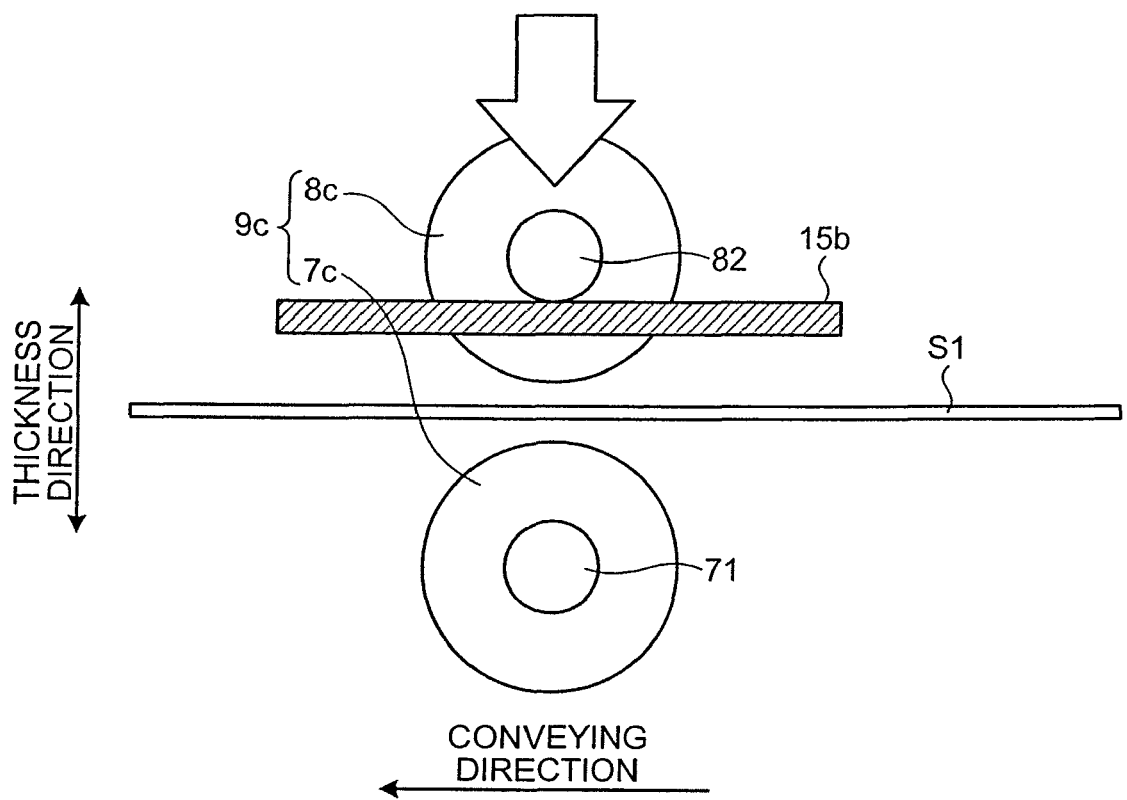
FIG. 10 is a cross section of the conveying unit in conveying direction when conveying a sheet document.

On the other hand, in the case of conveying a sheet document S1, the driven rollers 8a and 8b in the first roller group 91 come in contact with the fed sheet document S1 as shown in FIGS. 9 and 10. At this time, the biasing force on the driven roller 8c, which moves independent of the driven rollers 8a and 8b, is controlled when the stopper member 15b abuts against the second support shaft 82. As a result, the driven roller 8c is prevented from abutting against the driving roller 7c. Consequently, the driven roller 8c does not make contact with the fed sheet document S1, which is thinner than the card document S2, and the biasing force of the driven roller 8c is not transmitted to the sheet document S1. In other words, as the stopper member 15b abuts against the second support shaft 82, the position of the driven roller 8c is maintained closer to the corresponding compression springs 83 as compared to the driven rollers 8a and 8b. As a result, the sheet document S1 is not nipped between the driven roller 8c and the driving roller 7c. Thus, although the pair of rollers 9c is arranged within the sheet-document conveying area T1, it is used to convey only the card documents S2 having more thickness than the sheet documents S1.

As described above, in the case of conveying a fed sheet document S1, the driven rollers 8a and 8b in the first roller group 91 come in contact with the fed sheet document S1. That is, as the driven rollers 8a and 8b are biased towards the driving rollers 7a and 7b, respectively, the fed sheet document S1 gets nipped between the driven roller 8a and the driving roller 7a, and the driven roller 8b and the driving roller 7b. The nipped sheet document S1 is then conveyed further when the driving rollers 7a and 7b rotate. Because the pairs of rollers 9a and 9b are arranged symmetrically across the first center position C1 in the width direction, the biasing force on the driven roller 8a and the driven roller 8b is transmitted almost identically to each sheet document S1 in the width direction. As a result, the fed sheet document S1 gets nipped between the driven roller 8a and the driving roller 7a, and the driven roller 8b and the driving roller 7b in an even and balanced manner, and is stably conveyed further in a maintained position.

Figure 13A:
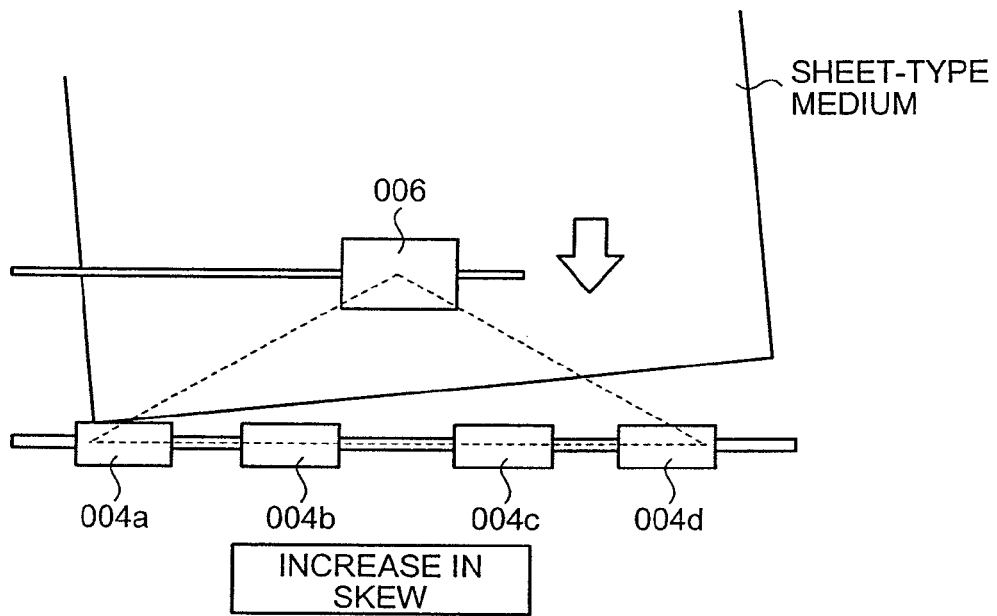
FIG. 13A is a plane view of another conventional image reading apparatus.
Figure 13B:
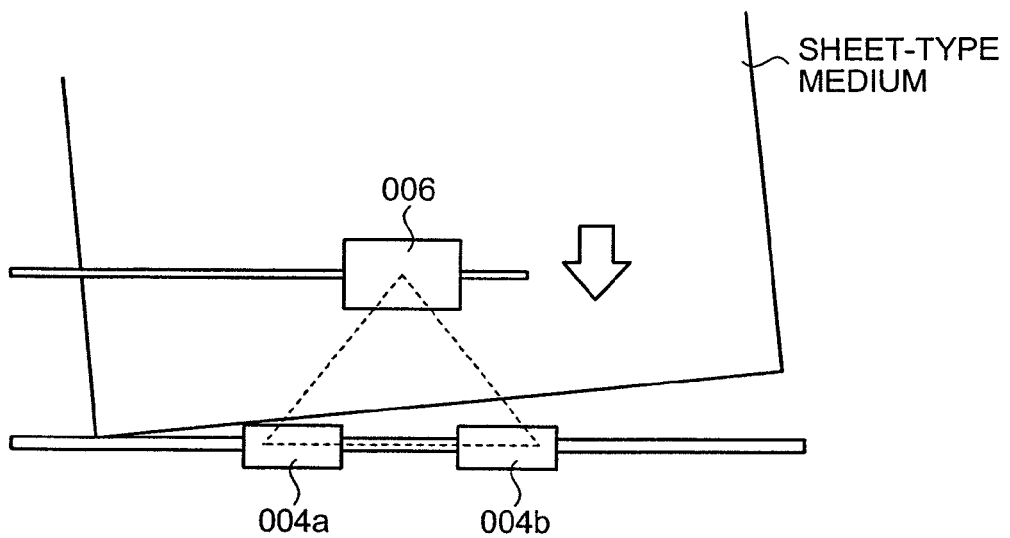
FIG. 13B is a plane view of still another conventional image reading apparatus.

The center position of the first roller group 91 in the width direction is identical to the first center position C1. Moreover, the pair of rollers 9c lies within the sheet-document conveying area T1 and outside the pair of rollers 9b in the width direction. The second boundary lies on further outer side of the pair of rollers 9c. Consequently, the first boundary lies at a distance from the first center position C1 that is equal to the distance between the pair of rollers 9b and the second boundary. That is, the distance between the pair of rollers 9a and the first boundary depends on the distance between the pair of rollers 9b and the second boundary, between which the pair of rollers 9c lies. Thus, the pair of rollers 9b lies closer to the first center position C1 than the pair of rollers 9c. Consequently, because the pairs of rollers 9a and 9b are arranged symmetrically across the first center position C1, the pair of rollers 9a also lies closer to the first center position C1. Due to such a configuration, the distance between the pairs of rollers 9a and 9b is relatively less. As a result, e.g., even if a sheet document S1 gets skewed by a small amount before reaching the first roller group 91, the skew can be prevented from increasing unlike, e.g., in the case of a conventional image reading apparatus described with reference to FIG. 13A.

Hence, even if a skewed sheet document S1 reaches the first roller group 91, it is possible to minimize the time lag between, e.g., the pair of rollers 9a nipping the sheet document S1 first and the pair of rollers 9b nipping the sheet document S1 after the pair of rollers 9a has already started to convey the nipped portion of the sheet document S1. Thus, the portion of the sheet document S1 nipped and conveyed by the pair of rollers 9a does not precede the portion of the sheet document S1 nipped and conveyed by the pair of rollers 9b by a large margin. As a result, the skew can be prevented from increasing at the first roller group 91.

Meanwhile, it is preferable to arrange the first roller group 91 within a width of the conveying path sufficient to convey a sheet document S1 of the minimum available size that the optical scanning unit 4 is able to scan. In other words, it is preferable to arrange the first roller group 91 within a width of the conveying path that is necessary for the conveying unit 3 to convey a sheet document S1 of the minimum available size. Such a configuration enables stable conveyance of even a smallest available sheet document S1 via the first roller group 91 thereby preventing increase in any skew if present.

Moreover, as described above, the second roller group 92 is arranged within the sheet-document conveying area T1. Thus, the card-document conveying area T2 overlaps the sheet-document conveying area T1 over a larger area in the width direction. As a result, it is possible to downsize the ADF scanner 1.

Moreover, because both the second roller group 92 as well as the card-document conveying area T2 are arranged within the sheet-document conveying area T1, the image sensor in the optical scanning unit 4 can be used to combinedly scan the sheet documents S1 and the card documents S2 for obtaining images thereby enabling to downsize the conveying unit 3 in the width direction. That is, by covering the sheet-document conveying area T1 for scanning the sheet documents S1, the image sensor in the optical scanning unit 4 automatically covers the card-document conveying area T2 for scanning the card documents S2. Hence, it is not necessary to arrange a separate image sensor for exclusively scanning the card documents S2 or to elongate the image sensor in the main scanning direction. Furthermore, because the pair of rollers 9b, which is arranged between the pair of rollers 9a and the pair of rollers 9c, forms part of the first roller group 91 as well as the second roller group 92, it is possible to downsize the conveying unit 3 in the width direction and reduce the constituent elements of the ADF scanner 1.

As described above, the motor 11a is used to rotate the driving rollers 7 as well as the pick roller 22, and the array of transmitting gears 11d is used to vary the rotating speeds of the driving rollers 7 and the pick roller 22. Moreover, the pick roller 22 is arranged above the first center position C1. Such a configuration may cause a small amount of skew when, e.g., a comparatively thin sheet document S1 fed from the ADF unit 2 is conveyed over the pick roller 22. The skew may also go on increasing in such a case. However, by arranging the first roller group 91 in the abovementioned manner, it is possible to efficiently prevent the increase in skew.

To sum up, the pick roller 22 and the separation pad 23 automatically feed to the conveying unit 3 a single sheet document S1 at a time from among the sheet documents S1 stacked on the stacking surface 21a. The conveying unit 3 conveys the fed sheet document S1 to the optical scanning unit 4 over the bend section 3a, and discharges the scanned sheet document S1 to the stacking unit 5. That is, the conveying direction of each fed sheet document S1 changes at the bend section 3a such that the optical scanning unit 4 can scan each conveyed sheet document S1 to obtain two-dimensional image data. The scanned sheet documents S1 are then discharged to the stacking unit 5. In this case, the first roller group 91 (the pairs of rollers 9a and 9b) convey the sheet documents S1. On the other hand, the conveying unit also carries the card documents S2, which are manually fed one by one from the card-document feeding unit 10, directly to the optical scanning unit 4 and discharges the scanned card documents S2 to the stacking unit 5. That is, the optical scanning unit 4 scans the card documents S2, which are conveyed thereto in a straight conveying path by bypassing the bend section 3a, to obtain two-dimensional image data. In this case, the second roller group 92 (the pairs of rollers 9b and 9c) convey the card documents S2. Thus, both the sheet documents S1 and the card documents S2 are stably conveyed in a maintained position.

As described above, the first roller group 91 includes the pairs of rollers 9a and 9b. The center position of the first roller group 91 in the width direction is identical to the first center position C1. Similarly, the second roller group 92 includes the pairs of rollers 9b and 9c. The center position of the second roller group 92 in the width direction is identical to the second center position C2. The pair of rollers 9c lies within the sheet-document conveying area T1 and outside the first roller group 91 in the width direction. The stopper member 15b is arranged to control the biasing force on the driven roller 8c with respect to the sheet documents S1.

In the case of conveying a fed card document S2, the driven rollers 8b and 8c in the second roller group 92 come in contact with the fed card document S2 within the card-document conveying area T2. On the other hand, in the case of conveying a sheet document S1, the driven rollers 8a and 8b in the first roller group 91 come in contact with the fed sheet document S1 within sheet-document conveying area T1. Moreover, the stopper member 15b controls the biasing force on the driven roller 8c such that the driven roller 8c does not make contact with the sheet document S1. Thus, the card-document conveying area T2 can be arranged to partially overlap the sheet-document conveying area T1 such that the ADF scanner 1 is downsized in the width direction. Moreover, the sheet documents S1 and the card documents S2 are stably conveyed by the first roller group 91 and the second roller group 92, respectively. By arranging the driven roller 8c outside of the first roller group 91 within the sheet-document conveying area T1, the pairs of rollers 9a and 9b in the first roller group 91 can be arranged closer to the first center position C1. Due to such a configuration, the distance between the pairs of rollers 9a and 9b, which 11e across the first center position C1, is relatively less. As a result, e.g., even if a sheet document S1 gets skewed by a small amount before reaching the first roller group 91, the skew can be prevented from increasing. Thus, the sheet document S1 can be stably conveyed to the optical scanning unit 4 for scanning.

Moreover, the second roller group 92 is arranged within the sheet-document conveying area T1, and the center position of the second roller group 92 in the width direction is identical to the second center position C2. Due to such a configuration, the card-document conveying area T2 overlaps the sheet-document conveying area T1 over a larger area in the width direction, resulting in downsizing of the conveying unit 3 in the width direction.

Furthermore, because both the first roller group 91 as well as the card-document conveying area T2 are arranged within the sheet-document conveying area T1, the image sensor in the optical scanning unit 4 can be used to combinedly scan the sheet documents S1 and the card documents S2 for obtaining images thereby enabling to downsize the conveying unit 3 in the width direction. As a result, a compact ADF scanner 1 can be manufactured at low cost.

Moreover, because the pair of rollers 9b, which is arranged between the pair of rollers 9a and the pair of rollers 9c, forms part of the first roller group 91 as well as the second roller group 92, it is possible to downsize the conveying unit 3 in the width direction and reduce the constituent elements of the ADF scanner 1.

Furthermore, the first roller group 91 is arranged within the width sufficient to convey a sheet document S1 of the minimum available size that the optical scanning unit 4 is able to scan. In other words, it is preferable to arrange the first roller group 91 within the width that is necessary for the conveying unit 3 to convey a sheet document S1 of the minimum available size. Such a configuration enables reducing the size of the first roller group 91 such that even a smallest available sheet document S1 can be stably conveyed. That helps in preventing the increase in any skew if present.

Moreover, the pairs of rollers 9a and 9b are arranged symmetrically across the first center position C1 in the width direction. Thus, the biasing force on the driven rollers 8a and 8b is transmitted almost identically to each sheet document S1 in the width direction. As a result, the fed sheet document S1 gets nipped between the driven roller 8a and the driving roller 7a, and the driven roller 8b and the driving roller 7b in an even and balanced manner, and is stably conveyed further in a maintained position. Similarly, the pairs of rollers 9b and 9c are arranged symmetrically across the second center position C2 in the width direction. Thus, the biasing force on the driven rollers 8b and 8c is transmitted almost identically to each card document S2 in the width direction. As a result, the fed card document S2 gets nipped between the driven roller 8b and the driving roller 7b, and the driven roller 8c and the driving roller 7c in an even and balanced manner, and is stably conveyed further in a maintained position.

Furthermore, the driven rollers 8a and 8b are fixed around the first support shaft 81, while the driven roller 8c is fixed around the second support shaft 82. One compression spring 83 is attached to each side of the first support shaft 81 as well as the second support shaft 82. The first support shaft 81 is biased towards the driving rollers 7a and 7b by the compression springs 83 attached thereto. Similarly, the second support shaft 82 is biased towards the driving roller 7c by the compression springs 83 attached thereto. The stopper member 15b is arranged to abut against the second support shaft 82 from the side opposite to which the compression springs 83 are arranged. As a result, the movement of the driven roller 8c towards the driving roller 7c is controlled such that the biasing force on the driven roller 8c is not transmitted to the sheet document S1.

As described above, the ADF scanner 1 includes the ADF unit 2 and the rotating unit 11. The ADF unit further includes the shooter 21 on which the sheet documents S1 are stacked and the pick roller 22 that feeds a single sheet document S1 at a time from the stack to the conveying unit 3. The rotating unit 11 rotates the driving rollers 7 and the pick roller 22 at different rotating speeds. That facilitates in maintaining a predetermined distance between the trailing edge of a sheet document S1 fed from the ADF unit 2 and the leading edge of a next sheet document S1 to be fed, and also downsizing the ADF scanner 1. Moreover, even if a comparatively thin sheet document S1 gets skewed at the pick roller 22 by a small amount, it is possible to efficiently prevent increase in the skew at the first roller group 91. Meanwhile, although the motor 11a rotates the driving rollers 7 as well as the pick roller 22 enables to downsize the ADF scanner 1, such a configuration may also cause a small amount of skew when, e.g., a comparatively thin sheet document S1 fed from the ADF unit 2 is conveyed over the pick roller 22. However, by arranging the first roller group 91 in the above-mentioned manner, it is possible to efficiently prevent increase in the skew. That is, downsizing of the ADF scanner 1 and curbing the skew can be achieved in a balanced manner.

Moreover, the ADF scanner 1 includes the card-document feeding unit 10 from which the card documents S2 can be manually fed one by one. The card documents S2 are smaller in width than the sheet documents S1. Each fed card document S2 reaches the conveying unit 3 by laterally passing by the pick roller 22 in the width direction. The pick roller 22 is arranged as inferiorly as possible in the ADF unit 2 such that the card document S2 passes by the pick roller 22. Such a configuration helps in reducing the height of the ADF scanner 1.

Furthermore, the ADF scanner 1 includes the stacking unit 5 that receives the sheet documents S1 and the card documents S2 discharged after scanning. The conveying path from the ADF unit 2 to the stacking unit 5 has a bend at the bend section 3a. Such a configuration facilitates in downsizing the ADF scanner 1. On the other hand, a straight conveying path is laid from the card-document feeding unit 10 to the stacking unit 5. Thus, there is no possibility of the card documents S2 getting bent or damaged at the bend section 3a. Moreover, no large driving force is required to convey the card documents S2 over a straight conveying path. That facilitates in downsizing the ADF scanner 1.

In the embodiment described above, although the motor 11a is used to combinedly rotate the driving roller 7 and the pick roller 22, two driving motors can also be arranged to separately rotate the driving roller 7 and the pick roller 22.

Figure 11A:
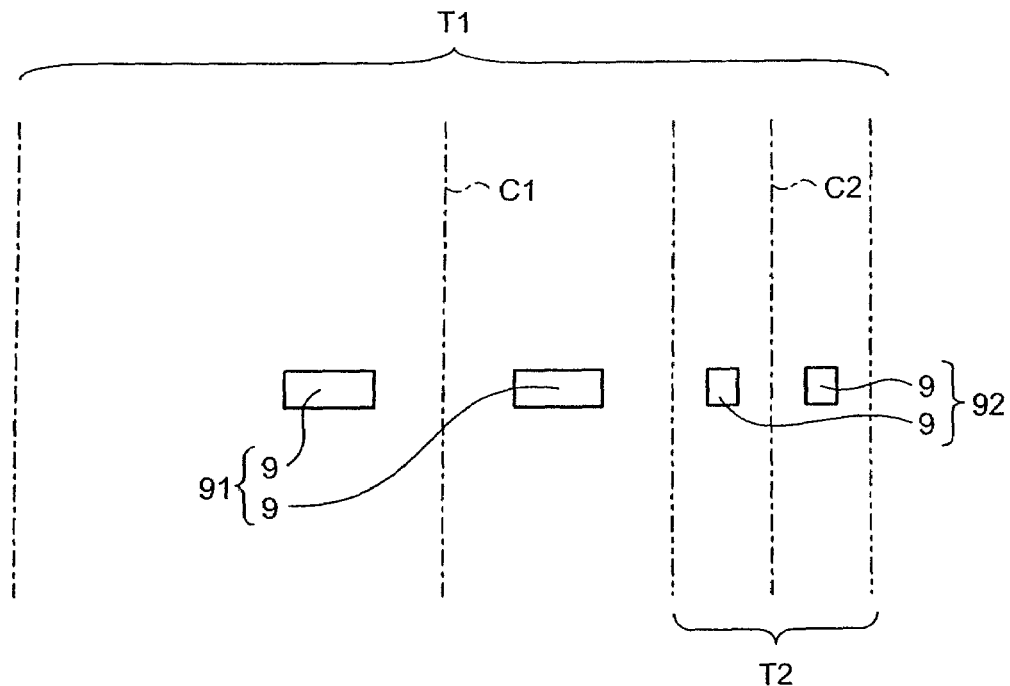
FIG. 11A is a schematic diagram of an ADF scanner according to a first modification of the embodiment.
Figure 11B:
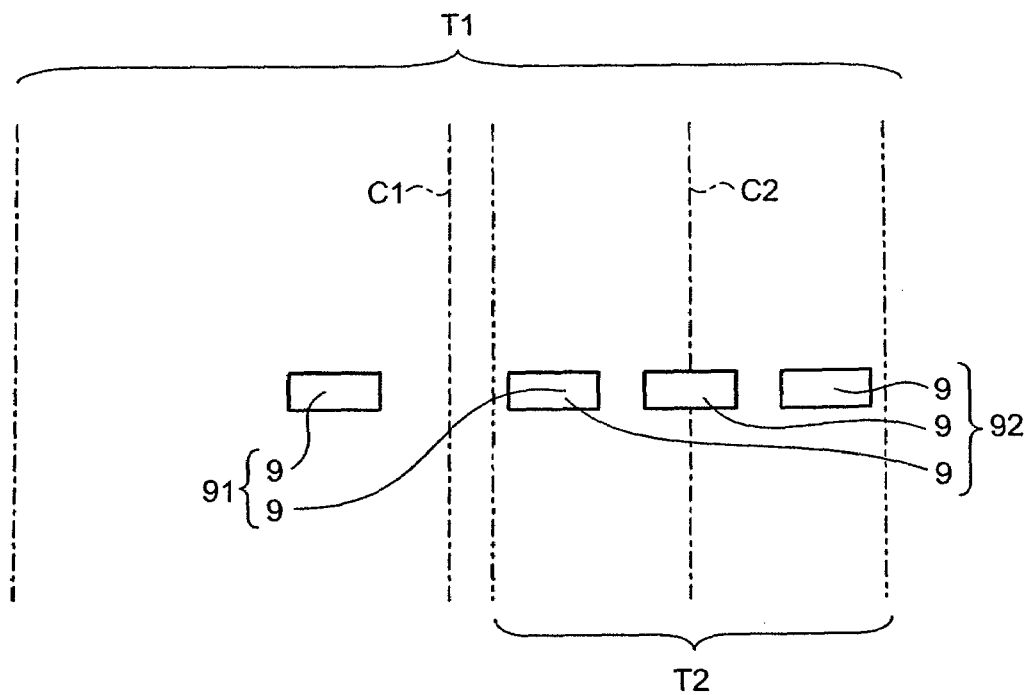
FIG. 11B is a schematic diagram of an ADF scanner according to a second modification of the embodiment.
Figure 12:
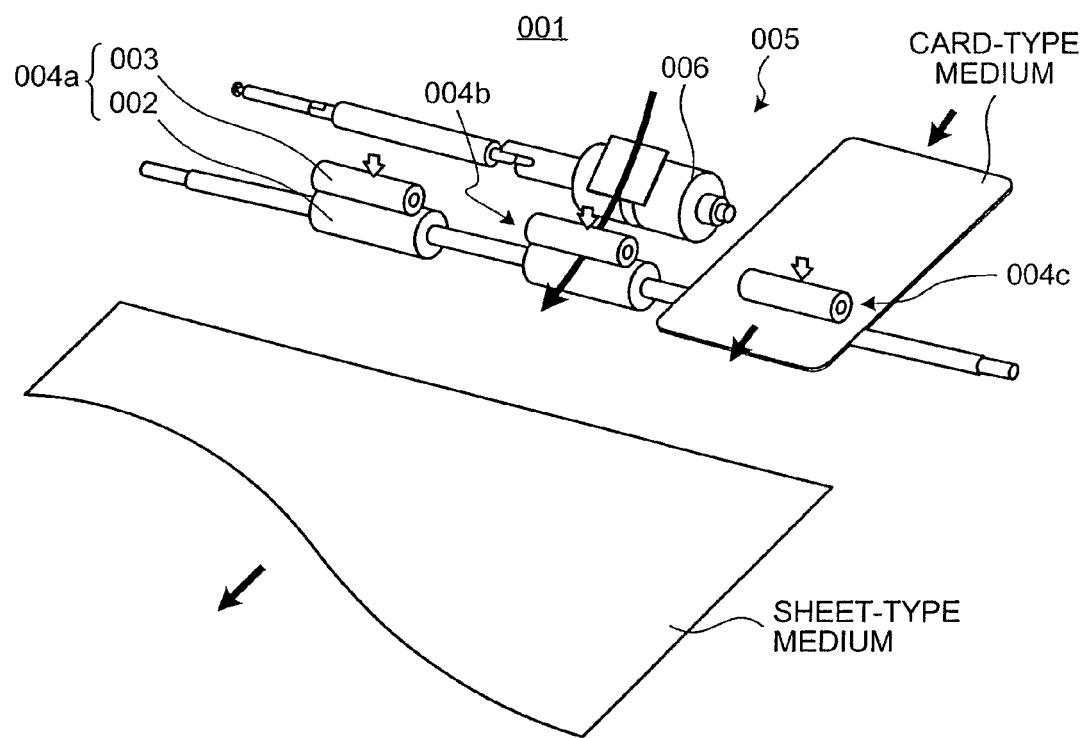
FIG. 12 is a perspective view of a conventional image reading apparatus.

Moreover, although the pair of rollers 9b arranged between the pair of rollers 9a and the pair of rollers 9c is used commonly in the first roller group 91 as well as the second roller group 92, it is also possible to, e.g., have a configuration in which none of the pairs of rollers 9 is used commonly in the first roller group 91 and the second roller group 92 as shown in FIG. 11A. In that case, the stopper member 15b can be arranged to control all the pairs of rollers 9 (two pairs of rollers 9 shown in FIG. 9) in the second roller group 92. The first roller group 91 and the second roller group 92 need not be in alignment with respect to the conveying direction. Furthermore, as shown in FIG. 11B, the second roller group 92 can be configured to include three pairs of rollers and only a pair of rollers nearest to the first center position C1 can be used as a part of the first roller group 91. In that case, the stopper member 15b can be arranged to control the remaining two pairs of rollers 9 in the second roller group 92. To sum up, the arrangement of the pairs of rollers 9 in the width direction is not limited to the above-mentioned description.

Moreover, although the stopper member 15b is explained as being integrated with the covering body 15a, it is also possible to arrange the stopper member 15b separately. For example, the stopper member 15b can be an independent protrusion that directly abuts against the second support shaft 82 from the side opposite to which the compression springs 83 corresponding to the driven roller 8c are arranged.

Furthermore, in the above description, the whole second roller group 92 is arranged within the sheet-document conveying area T1. However, it is also possible to arrange the second roller group 92 such that at least one of the pairs of rollers 9 with the stopper member 15b abutted thereto lies outside the first roller group 91 and within the sheet-document conveying area T1. One or more of the remaining pairs of rollers 9 in the second roller group 92 can be arranged outside the sheet-document conveying area T1. On the other hand, it is also possible that the whole second roller group 92 is arranged within the sheet-document conveying area T1 but a part of the card-document conveying area T2 lies outside the sheet-document conveying area T1.

Moreover, instead of using the ADF unit 2 that automatically separates a single sheet document at a time from the sheet documents stacked therein and feed the separated sheet document to the conveying unit 3, a manual feeding unit can be used to manually feed the sheet documents one by one.

To sum up, according to an aspect of the present invention, even if a sheet-type medium to be read in the image reading apparatus gets skewed while being fed to a conveying unit, the skew can be prevented from increasing. Thus, the sheet-type medium can be stably conveyed to an image reading unit in a maintained position. Besides, a biasing force on corresponding driven rollers is transmitted almost identically to a sheet-type medium and a card-type medium in the width direction. As a result, the sheet-type medium as well as the card-type medium is stably conveyed in a maintained position. The biasing force on a driven roller can be controlled with a simple configuration.

Moreover, it is possible to downsize the conveying unit. As a result, a compact image reading apparatus can be manufactured at low cost.

Moreover, it is possible to maintain a predetermined distance between the trailing edge of a medium and the leading edge of the next medium.

Furthermore, there is no possibility of a card-type medium getting bent or damaged by being forced to bend, and no large driving force is required to convey the card-type medium over a straight conveying path.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   a reading unit that reads an image from a first medium and a second medium thicker than the first medium; and
   a conveying unit that includes a plurality of pairs of rollers, each pair including a driving roller and a driven roller that is biased towards the driving roller and rotates along with the driving roller, and that conveys the first medium and the second medium to the reading unit while nipping the first medium and the second medium between the driving rollers and the driven rollers, the plurality of pairs of rollers being arranged along a direction of a rotation axis of the driving rollers and including:
a first roller group that includes at least two adjacent pairs of the plurality of pairs of rollers and that conveys the first medium; and
a second roller group that includes at least two adjacent pairs of the plurality of pairs of rollers, the second roller group including a controlling member that controls a biasing force applied by at least one of the driven rollers of the second roller group to the first medium, and that conveys the second medium;
a first-roller-group center position, in the direction of the rotation axis of the at least two adjacent pairs of the first roller group, is identical to a first center position in the direction of the rotation axis of a first conveying area, over which the first medium is conveyed;
a second-roller-group center position, in the direction of the rotation axis of the at least two adjacent pairs of the second roller group, is identical to a second center position in the direction of the rotation axis of a second conveying area, over which the second medium is conveyed; and
at least one pair of the at least two adjacent pairs of rollers in the second roller group is arranged outside of one end of the first roller group in the direction of the rotation axis and within the first conveying area;
wherein the controlling member is configured to prevent the rollers in at least one pair of the plurality of pairs of rollers in the second roller group from abutting each other when the first medium is conveyed.

2. The image reading apparatus according to claim 1, wherein the second roller group is arranged within the first conveying area.

3. The image reading apparatus according to claim 1, wherein the second conveying area is arranged within the first conveying area.

4. The image reading apparatus according to claim 1, wherein at least one pair of rollers in the second roller group forms a part of the first roller group.

5. The image reading apparatus according to claim 1, wherein the first roller group is arranged along the direction of the rotation axis within a width of a conveying path for conveying a first medium having a minimum size readable by the reading unit.

6. The image reading apparatus according to claim 1, wherein
pairs of rollers in the first roller group are arranged symmetrically about the first center position, and
pairs of rollers in the second roller group are arranged symmetrically about the second center position.

7. The image reading apparatus according to claim 1, further comprising:
a support shaft that rotatably supports the driven roller; and
a biasing member that is arranged on a side of the shaft and biases the driven roller towards the driving roller, wherein
the controlling member is arranged to abut against the support shaft on a side opposite to which the biasing member is arranged.

8. The image reading apparatus according to claim 1, further comprising:
a stacking unit that contains a stack of first media;
a first feeding unit that includes a pick roller arranged above the first center position, the pick roller separating a single first medium from the stack and feeding the first medium to the conveying unit; and
a rotating unit for rotating the driving rollers and the pick roller at different rotating speeds.

9. The image reading apparatus according to claim 8, wherein the second medium is smaller in width than the first medium, the image reading apparatus further comprising:
a second feeding unit from which the second medium is fed to the conveying unit, the second feeding unit being arranged on one side of the pick roller in a width direction.

10. The image reading apparatus according to claim 9, further comprising a discharge unit that receives the first medium and the second medium conveyed by the conveying unit, wherein
a conveying path from the first feeding unit to the discharge unit includes a bend section, and
a conveying path from the second feeding unit to the discharge unit is linear.

11. An image reading apparatus comprising:
a reading unit for reading an image from a first medium and a second medium thicker than the first medium; and
a conveying unit that includes:
a plurality of pairs of rollers, each pair including a driving roller and a driven roller that is biased towards the driving roller and rotates along with the driving roller, for conveying the first medium and the second medium to the reading unit while nipping the first medium and the second medium between the driving rollers and the driven rollers, the plurality of pairs of rollers being arranged along a direction of a rotation axis of the driving rollers; and
a cover plate that covers the driven rollers;
wherein the plurality of pairs of rollers including:
a first roller group that includes at least two adjacent pairs of the plurality of pairs of rollers for conveying the first medium; and
a second roller group that includes at least two adjacent pairs of the plurality of pairs of rollers, and a stopping member disposed on a portion of the cover plate that covers the second roller group, the stopping member configured to control a biasing force applied by at least one of the driven rollers of the second roller group to the first medium, and for conveying the second medium;
a first-roller-group center position, in the direction of the rotation axis of the at least two adjacent pairs of the first roller group, is identical to a first center position in the direction of the rotation axis of a first conveying area, over which the first medium is conveyed,
a second-roller-group center position, in the direction of the rotation axis of the at least two adjacent pairs of the second roller group, is identical to a second center position in the direction of the rotation axis of a second conveying area, over which the second medium is conveyed, and
at least one pair of the at least two adjacent pairs of rollers in the second roller group is arranged outside of one end of the first roller group in the direction of the rotation axis and within the first conveying area.

12. An image reading apparatus comprising:
a reading unit for reading an image from a first medium and a second medium thicker than the first medium;
a conveying unit that includes a plurality of pairs of rollers, each pair including a driving roller and a driven roller that is biased towards the driving roller and rotates along with the driving roller, for conveying the first medium and the second medium to the reading unit while nipping the first medium and the second medium between the driving rollers and the driven rollers, the plurality of pairs of rollers being arranged along a direction of a rotation axis of the driving rollers and including:
- a first roller group that includes at least two adjacent pairs of the plurality of pairs of rollers for conveying the first medium; and
- a second roller group that includes at least two adjacent pairs of the plurality of pairs of rollers, the second roller group including a controlling member for controlling a biasing force applied by at least one of the driven rollers of the second roller group to the first medium, and for conveying the second medium;
- a first-roller-group center position, in the direction of the rotation axis of the at least two adjacent pairs of the first roller group, is identical to a first center position in the direction of the rotation axis of a first conveying area, over which the first medium is conveyed,
- a second-roller-group center position, in the direction of the rotation axis of the at least two adjacent pairs of the second roller group, is identical to a second center position in the direction of the rotation axis of a second conveying area, over which the second medium is conveyed,
- at least one pair of the at least two adjacent pairs of rollers in the second roller group is arranged outside of one end of the first roller group in the direction of the rotation axis and within the first conveying area;
- a stacking unit that contains a stack of first media;
- a first feeding unit that includes a pick roller arranged above the first center position, the pick roller separating a single first medium from the stack and feeding the first medium to the conveying unit; and
- a rotating unit for rotating the driving rollers and the pick roller at different rotating speeds.

13. The image reading apparatus according to claim 12, wherein the second medium is smaller in width than the first medium, the image reading apparatus further comprising:
- a second feeding unit from which the second medium is fed to the conveying unit, the second feeding unit being arranged on one side of the pick roller in a width direction.

14. The image reading apparatus according to claim 13, further comprising a discharge unit that receives the first medium and the second medium conveyed by the conveying unit, wherein
- a conveying path from the first feeding unit to the discharge unit includes a bend section, and
- a conveying path from the second feeding unit to the discharge unit is linear.

* * * * *